United States Patent [19]

Fournier

[11] 4,389,891
[45] Jun. 28, 1983

[54] SYSTEM FOR MEASURING RESONANCE FREQUENCIES IN TURBINE AND COMPRESSOR VANES AND PROPELLER BLADES

[75] Inventor: Jacques M. A. Fournier, Chatillon, France

[73] Assignee: Societe Nationale d'Etude et de Construction de Moteurs d'Aviation, "S.N.E.C.M.A.", Paris, France

[21] Appl. No.: 277,030

[22] Filed: Jun. 24, 1981

[30] Foreign Application Priority Data

Jun. 24, 1980 [FR] France .................. 80 13935

[51] Int. Cl.$^3$ .................. G01H 13/00; G01H 1/00; G01D 1/00
[52] U.S. Cl. .................. 73/579; 73/583; 73/658
[58] Field of Search .................. 73/579, 583, 597, 658

[56] References Cited

U.S. PATENT DOCUMENTS

| | | | |
|---|---|---|---|
| 2,729,972 | 1/1956 | Schwidetzky | 73/583 |
| 2,936,612 | 5/1960 | Mason | 73/577 |
| 2,950,619 | 8/1960 | Schuerch | 73/583 |
| 3,015,948 | 1/1962 | Kearns | 73/583 |
| 3,023,610 | 3/1962 | Prochazka | 73/583 X |
| 3,039,296 | 6/1962 | Destuynder et al. | 73/579 |
| 3,059,468 | 10/1962 | Rowe | 73/579 |
| 3,600,934 | 8/1971 | Hendrix | 73/577 |
| 3,610,027 | 10/1971 | Woboditsch | 73/579 X |
| 3,664,179 | 5/1972 | Danko et al. | 73/579 |
| 3,899,921 | 7/1975 | Hockley | 73/579 |
| 4,070,022 | 1/1978 | Braly | 73/579 X |
| 4,170,141 | 10/1979 | Woo | 73/579 |
| 4,212,193 | 7/1980 | Turley | 73/579 X |

FOREIGN PATENT DOCUMENTS

| | | | |
|---|---|---|---|
| 42780 | 12/1981 | European Pat. Off. | 73/579 |
| 2628954 | 12/1977 | Fed. Rep. of Germany | 73/579 |
| 1144882 | 10/1957 | France | 73/579 |
| 1366902 | 12/1964 | France | 73/579 |
| 386303 | 9/1973 | U.S.S.R. | 73/579 |
| 725679 | 4/1980 | U.S.S.R. | 73/579 |

OTHER PUBLICATIONS

"Review of Scientific Instruments", vol. 47, No. 9, Sep. 1976, A. Klimasara et al.: Automated Resonance-Bar Damping Measurement System, pp. 1163-1166–*Description of the System*-Figure 1.

*Primary Examiner*—Anthony V. Ciarlante
*Assistant Examiner*—David V. Carlson
*Attorney, Agent, or Firm*—Oblon, Fisher, Spivak, McClelland & Maier

[57] ABSTRACT

A system for measuring resonance frequencies in turbine and compressor vanes and propeller blades in which a vane or blade is excited at its base by a vibration generator and the phase of the excitation signal coming out of an acoustic transducer placed at the base is compared to that of the signal coming from a displacement transducer placed at the blade tip. The resulting phase error signal serves to pilot a variable-frequency oscillator which itself feeds the vibration generator, the frequency of which is noted by a frequency meter.

8 Claims, 9 Drawing Figures

4,389,891

SYSTEM FOR MEASURING RESONANCE FREQUENCIES IN TURBINE AND COMPRESSOR VANES AND PROPELLER BLADES

BACKGROUND OF THE INVENTION

1. Field of the Invention

This present invention relates to a system for measuring resonance frequencies in turbine and compressor vanes and in propeller blades.

2. Description of the Prior Art

In an engine, the rotating blades of the rotor undergo excitations in a very wide range of frequencies. Because of this, the blades may go into resonance, and the amplitude of oscillation may reach destructive values. Knowing the exact value of these resonance frequencies in the various modes makes it possible to minimize the harmful effects by applying appropriate remedies.

According to a known process, the blade is attached rigidly by its seating and is excited at its base by means of a sound generator, in particular a speaker. The blade's resonance is detected at its tip by means of a displacement transducer (in particular a magnetic or optical transducer). This transducer furnishes the frequency and amplitude of the blade's resonance. The maximum is sought by varying the frequency of the excitation signal and by correlatively measuring its amplitude in the displacement pick-up. The drawback of such a method lies in its relative slowness and also in its poor precision. Indeed, in the vicinity of the resonance frequency, the amplitude curve varies very little, and finding the maximum proves to be a delicate procedure if good precision is desired.

Furthermore, it is known that the mechanical or electrical oscillation of a body is characterized by two curves, which are shown in FIGS. 1a and 1b. In FIG. 1a the curve of the amplitude of A has been represented as a function of the frequency F which is utilized in the aforementioned procedure. In FIG. 1b the curve of the variation between the vibration (electrical or mechanical) phase of the excited body and the phase of the exciter signal taken in the plane of excitation is shown. As is visible in FIG. 1b, this curve has the peculiarity of passing through zero at the resonance frequency, and this is furthermore the place at which its slope is most accentuated.

SUMMARY OF THE INVENTION

Accordingly, one object of this invention is to provide a novel sysem for measuring resonance frequencies in turbine and compressor vanes and propeller blades utilizing the above noted peculiarity shown in FIG. 1b, which makes it possible to design an excitation system in which the frequency is controlled by the criterion of phase.

This and other objects are achieved according to the present invention by providing a system including at least one acoustic transducer placed at the base of the blade, the phase of which is taken as reference for the excitation signal of the blade, and a displacement transducer placed near the tip of the blade from which the signal received is applied to one of the lead-ins of a phase discriminator, the other lead-in of which is connected to the acoustic transducer. The error voltage produced by the discriminator controls the frequency of an oscillator from which the signal is applied to the exciter and to a frequency meter allowing measurement of the oscillator's frequency when the system has reached equilibrium.

The system according to the invention allows precise measurement of the resonance frequencies of blades or vanes in very quick fashion, unlike the known systems which require a relatively longer period of time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
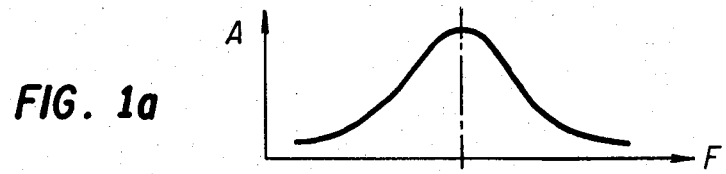
FIGS. 1a, 1b are graphs illustrating the mechanical or electrical oscillation of a body.
Figure 1B:
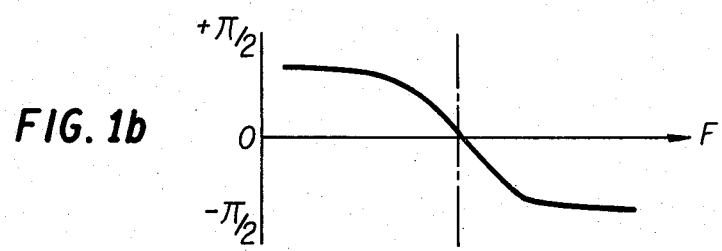
Figure 2:
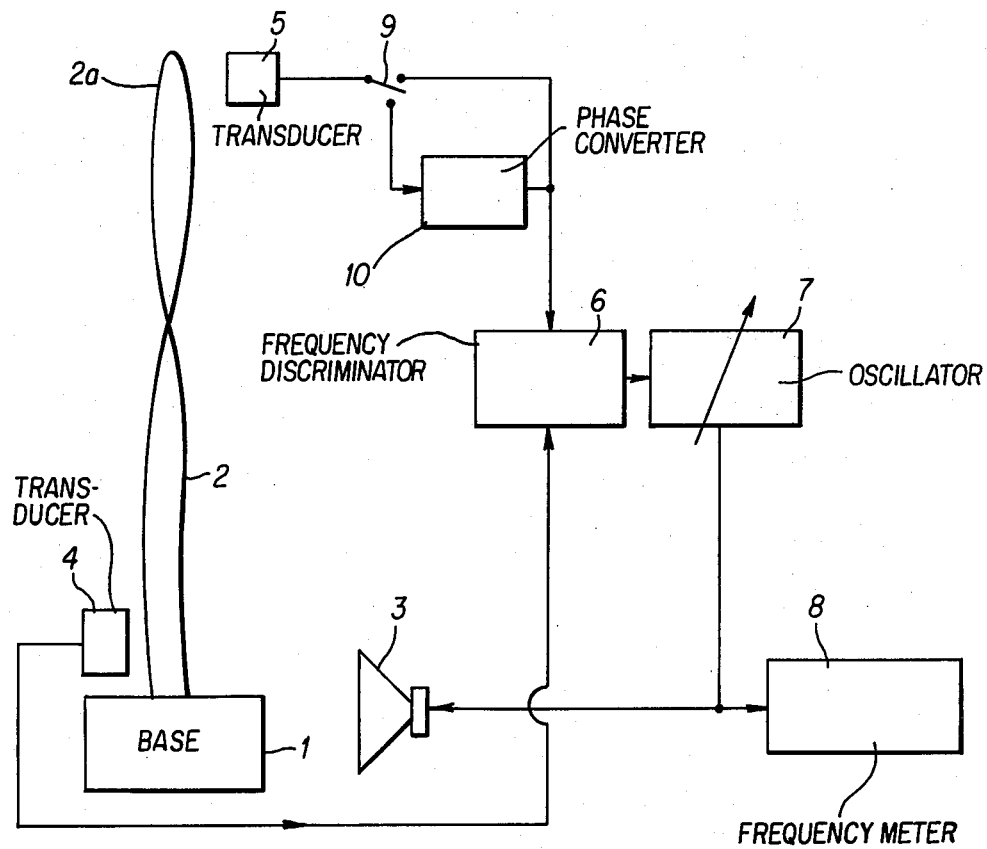
FIG. 2 is a diagram of a first embodiment of the system for measuring resonance frequencies in a blade according to the invention.

Referring now to the drawings, wherein like reference numerals designate identical or corresponding parts throughout the several views, and more particularly to FIG. 2 thereof, there is shown a diagram of a first embodiment of the system for measuring resonance frequencies in a blade or vane. This system includes a base 1 of substantial weight onto which is attached solidly and rigidly a turbine blade or vane 2 which is excited at its base by means of a sound generator 3, in particular a speaker. Onto the base 1 is fixed an acoustic transducer 4 in the plane of excitation X–X1 of the blade (FIG. 6) and at the base of the blade. Another transducer 5 of the displacement type (magnetic or optical) is arranged near the tip 2a of the blade, and it is connected to one of the lead-ins of a phase discriminator 6, the other lead-in of which is connected to the acoustic transducer 4.

The phase of the transducer 4 is taken as reference for the excitation signal which is applied to one of the lead-ins of the phase discriminator 6, while the other transducer 5 sends the signal received to the other lead-in of the phase discriminator. The error voltage put out by the phase discriminator 6 controls the frequency of an oscillator 7 to which it is connected, the signal from which is sent to the excitor 3. The oscillator 7 is also connected to a frequency meter 8 which allows measurement of the frequency of the oscillator 7 when the system reaches equilibrium. By means of a contactor 9, a phase converter 10 is connected between the transducer 5 and the frequency discriminator 6, making it possible to introduce at will a 180° phase displacement in order to select the various blade oscillation modes.

Figure 6:
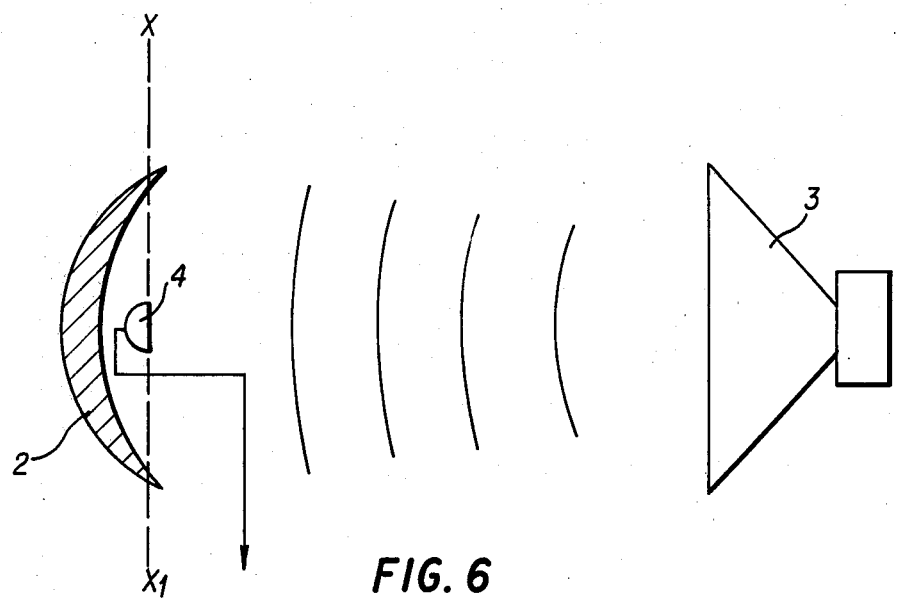
FIG. 6 is a diagrammatic view of the assembly of a speaker facing a blade and one acoustic transducer.

The phase of the transducer 4 in the base is taken as reference for the excitation signal. By definition, this reference is the phase of the excitation signal in the plane of the blade 2 (FIG. 6). If the phase at the output of the oscillator were taken as reference, it would be necessary to introduce a phase correction relative to the transfer function of the sound generator 3 (speaker) and to its distance from the blade 2. The transfer function of a sound generator, in particular a speaker, is very agitated and depends greatly on the nearby presence of a reflector element, in this case the blade 2, which creates stationary waves.

The characteristics of the sound-generator space-excitation unit are therefore too complex to be understood with the necessary precision. It is therefore easier to take the reference phase in the plane of excitation by means of transducers which are themselves measuring devices, the transfer functions of which are perfectly well known.

Figure 3:
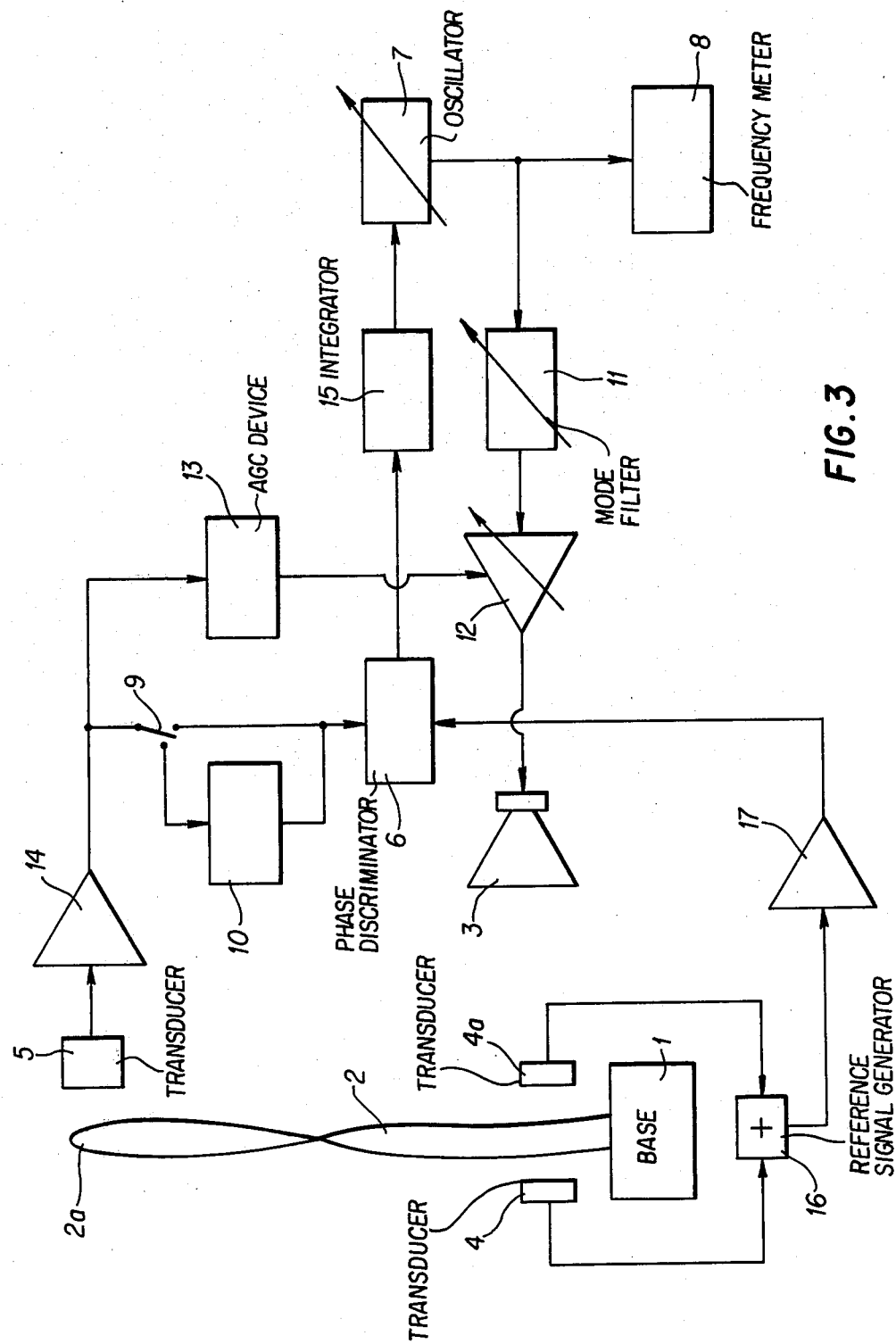
FIG. 3 is a diagram of a second embodiment of the system according to the invention.
Figure 5:
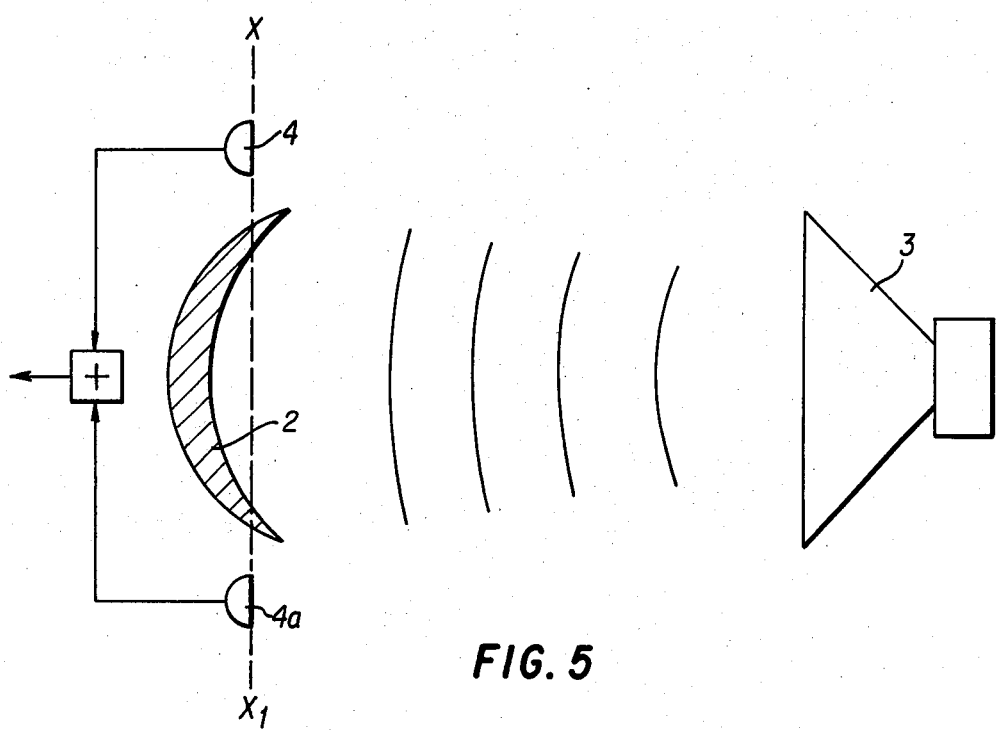
FIG. 5 is a diagrammatic view of the assembly of a speaker facing a blade and two acoustic transducers.

In FIG. 3, another embodiment of the system for measuring resonance frequencies according to the invention is shown, in which two acoustic tranducers 4, 4a are used arranged on either side of the blade 2 in its median plane of excitation X-X1 (FIG. 5). This arrangement is intended to make it possible to better define the equivalent plane of excitation, when the base of the blade is not a real plane as is often the case, by averaging the signals received by the two detectors. The two acoustic transducers 4, 4a are connected to a means 16 for producing a reference signal which is equal to the average of the two signals therefrom, these reference signals being amplified by an amplifier 17 before being applied to the lead-in of the phase discriminator 6.

When the blade is very hollow, it is possible to take the reference signal by means of a single acoustic detector 4 located at the center of the blade 2 (FIG. 6) if the dimensions allow.

Figure 4B:
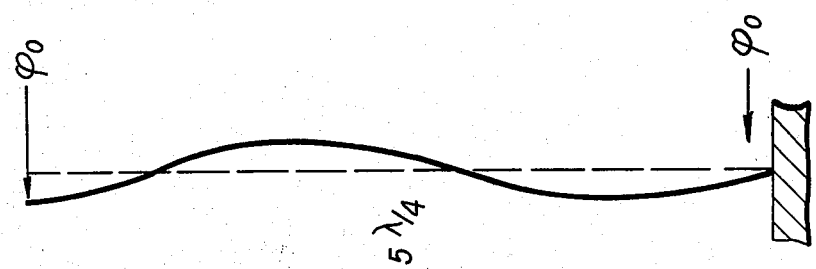
FIGS. 4, 4a and 4b are schematic views of a blade subjected to several modes of oscillation.
Figure 4A:
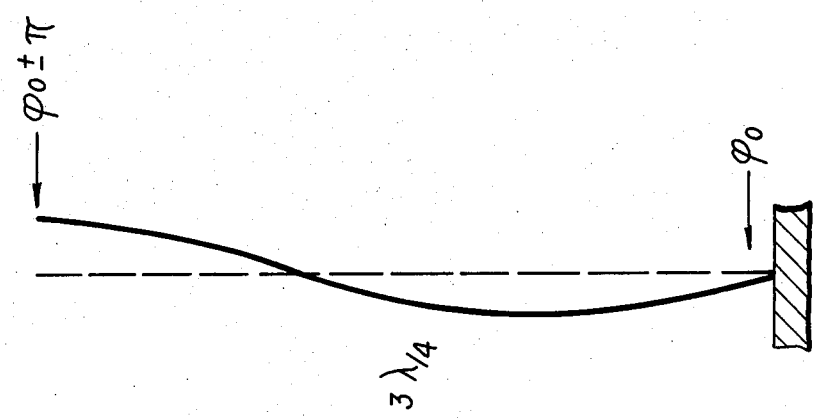
Figure 4:
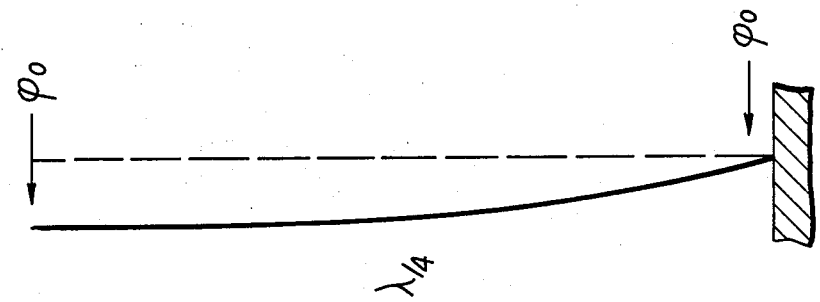

In the case of FIG. 3, the acoustic excitor 3 is powered through a filter 11 in order to select the desired mode of oscillation. This is always odd, but it may be equal to 1 (FIG. 4), to 3 (FIG. 4a), and to 5 (FIG. 4b). As is seen in FIGS. 4 and 4a, while the differentiation between the oscillation $\lambda/4$ and $3\lambda/4$ can be done by means of the phase at the blade end (difference of 180°), that (FIGS. 4 and 4b) between the oscillation at $\lambda/4$ and $5\lambda/4$ can only be done with the aid of a filter which keeps any energy from crossing the loop outside the range where the oscillation may be located.

Between the filter 11 and the excitor 3 is connected an amplifier 12, the gain of which is controlled by the output signal of the transducer through an automatic gain control device 13, an amplifier 14 being connected to the output of the transducer 5 and feeding the automatic gain control device as well as the phase discriminator 6. Indeed, the blades subjected to measurement have different morphologies and hence different Q-factors. Furthermore, this same overpotential is also different according to the degree of oscillation considered and, finally, the excitation device (speaker) has an output that develops in a nonnegligeable manner with the frequency. Furthermore, it is necessary to limit the elongation at the end of the blade 2a which might reach dangerous levels and lead in particular to rupture of the blade.

This system therefore makes it possible to operate at a constant elongation by automatically adapting the level of excitation of the acoustic exciter (speaker) to an appropriate level, taking into account all the aforementioned parameters.

Between the phase discriminator 6 and the oscillator 7, an integrator 15 is also provided, which is intended to filter the error signal and stabilize the servo-control loop.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for measuring resonance frequencies in at least one rotatable blade rigidly attached at a base thereof to a base, comprising:
   an excitor for generating sound waves in the vicinity of said blade;
   at least one acoustic transducer placed in the vicinity of the base of said blade for generating a phase signal, the phase of which can be used as a blade excitation reference;
   a displacement transducer placed in the vicinity of the tip of said blade for generating a second signal based on blade tip displacement;
   a phase discriminator which receives the signals from said at least one acoustic transducer and said displacement transducer and produces an error signal based on the phase difference therebetween;
   an oscillator coupled to the discriminator for producing a variable frequency output in dependence on said error signal, said variable frequency output applied to said excitor; and
   a frequency meter coupled to the variable frequency output of said oscillator for measuring the oscillator frequency when the system has reached equilibrium.

2. A system according to claim 1, comprising:
   a phase converter selectively provided between the displacement transducer and the phase discriminator for selecting various modes of oscillation of the blade.

3. A system according to claim 1, wherein the acoustic transducer is placed in a median plane of excitation of the blade.

4. A system according to claim 1, comprising:
   two acoustic transducers arranged on opposed sides of the blade in the median plane of excitation thereof; and
   means coupled to the two acoustic transducers for producing a reference signal which is equal to the average of the two signals from the two acoustic transducers.

5. A system according to claim 1, further comprising:
   an integrator connected between the phase discriminator and the oscillator.

6. A system according to claim 1, further comprising:
   a filter and an amplifier inserted between said oscillator and said excitor, the gain of said amplifier being controlled by the output signal from the displacement transducer placed near the tip of the blade.

7. A system according to claim 5, further comprising:
   the displacement transducer and the amplifier feeding the excitor being connected in series to another amplifier and an automatic gain control device.

8. A system according to claims 1, 3 or 7, comprising:
   an amplifier for amplifying the acoustic transducer signal fed to the phase discriminator.

* * * * *